March 31, 1936. F. E. GRECO 2,035,701
STRING BEAN GRADER
Filed Oct. 26, 1934
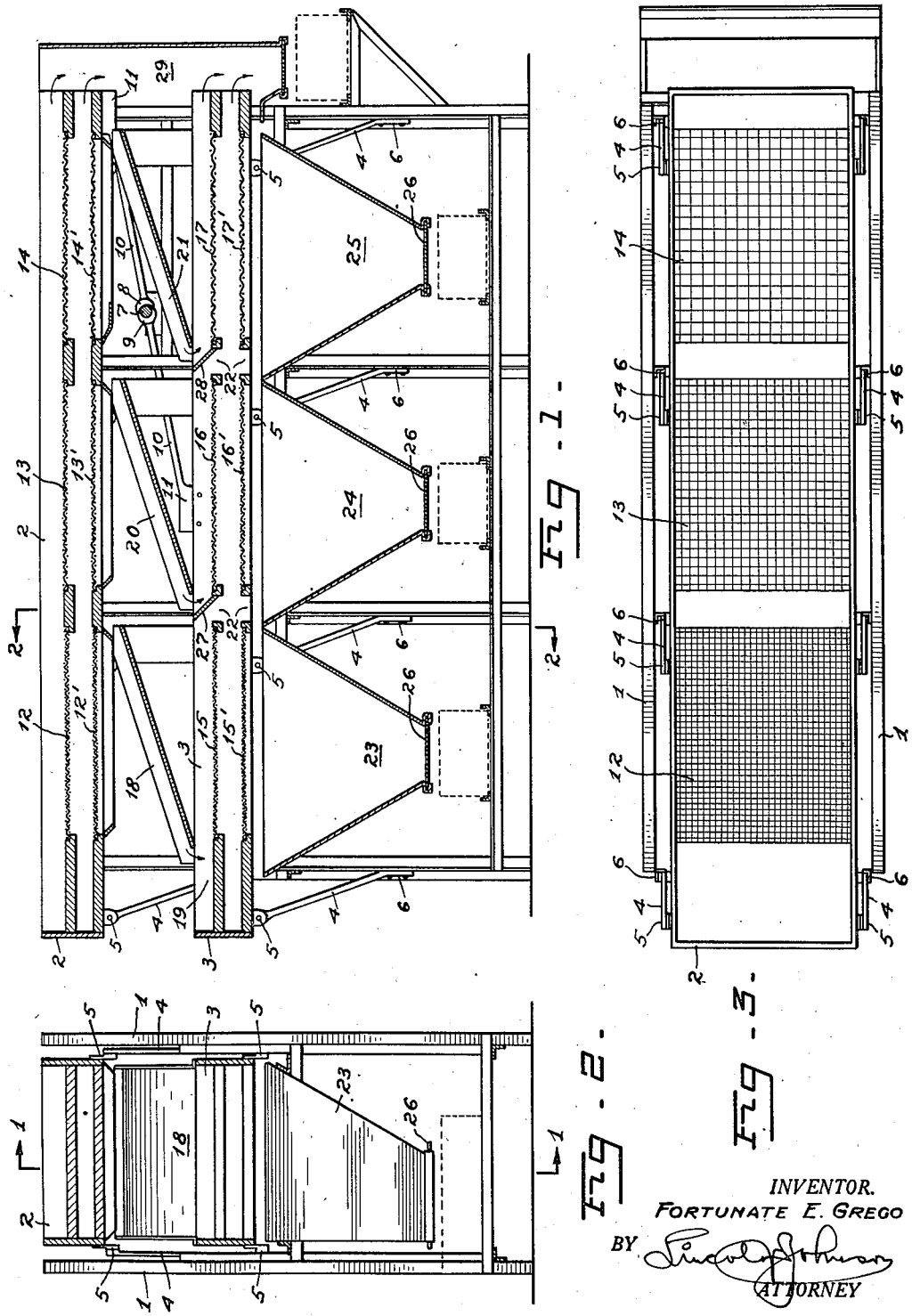
INVENTOR.
FORTUNATE E. GREGO
BY
ATTORNEY

Patented Mar. 31, 1936

2,035,701

UNITED STATES PATENT OFFICE 2,035,701

STRING BEAN GRADER

Fortunate E. Greco, San Jose, Calif.

Application October 26, 1934, Serial No. 750,083

6 Claims. (Cl. 209—311)

This invention relates particularly to a machine for grading cut length fruit and vegetables or irregular and elongated shape, according to the size of the cut lengths, and is particularly adaptable to grading cut length string beans.

An object of the invention is to provide a machine for grading fruits and vegetables of irregular and elongated shape which are pre-cut into indiscriminate lengths, and said pre-cut lengths segregated into a plurality of grades.

A further object of the invention is to provide a machine for grading string beans, pre-cut into irregular lengths, by subjecting the same to a shaking action while being passed through a plurality of screens of progressively increasing meshes, whereby the screens will segregate the various pre-cut lengths into one or more common grades.

Other objects and advantages are to provide a machine for grading cut length fruit and vegetables that will be superior in point of simplicity, inexpensiveness of construction, positiveness of operation, and facility and convenience in use and general efficiency.

In this specification and the annexed drawing the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawing:

Fig. 1 represents a vertical cross section taken through a grading machine constructed in accordance with my invention as indicated on the line 1—1 of Fig. 2.

Fig. 2 is a cross section taken through Fig. 1 on the line 2—2.

Fig. 3 is a plan view of Fig. 1.

In detail the construction illustrated in the drawing comprises a pair of parallel side frames 1—1, each of which is connected across the bottom thereof and suitably braced longitudinally and transversely. A pair of shaker troughs 2 and 3 are arranged in superposed relation adjacent the upper side of and between the parallel side frames 1—1. Each of the shaker troughs 2 and 3 is supported between the frames 1—1 by means of pitmans 4, each pitman being pivotally secured at 5 to the underside of each shaker trough throughout the length thereof, and at 6 to the side frames 1—1.

The pitmans 4 are preferably made of springy wood, such as hickory, or out of leaf springs, whereby the shaker troughs will be supported in a flexible position on the frames 1—1, and the upper surface of said shaker troughs will move in an orbitary path when subjected to a shaking movement. A drive shaft 7 is arranged transversely on the frame members 1—1, and said shaft is provided with a pair of cams 8 and 9 thereon. A shaker rod 10 is interposed between each shaker trough and the respective cams 8 and 9, said shaker rods being secured in rotatable position at one end to the respective cams 8 and 9 by an eccentric, and at the other end each rod is secured at 11 to the respective troughs 2 and 3. Rotative movement of the shaft 7 will cause the cams 8 and 9 to rotate, thereby causing the shaker rods 10 to reciprocate and to cause the shaker troughs 2 and 3 to reciprocate back and forth on the spring pitmans 4 on an orbitary path.

I have found that the orbitary movement of the shaker troughs is very desirable in advancing the objects to be graded over and through the shaker troughs, in that during a certain portion of the said movement, the objects being graded are caused to move vertically to and from the grading surface. Each of the shaker troughs 2 and 3 is rectangular in shape and consists of side and end walls, the interior of said troughs being provided with a plurality of pairs of grading screens therein.

The upper trough 2 is provided with the respective grading screens 12, 13 and 14, all of which are arranged on the same level and in flush alignment with each other, the grading screens 12 being approximately of ½" mesh; the screen 13 of approximately ¾" mesh; and the screen 14 of approximately 1" mesh. Paralleling the upper grading screens 12, 13 and 14, and in spaced relation to the under face of said screens, I have provided a lower level of grading screens 12', 13' and 14', said last mentioned screens registering with the screens lying directly thereabove, and being of the same mesh as said uppermost screens. The surface level of both rows of the screens in the trough 2 is continuous and uninterrupted throughout.

The lower trough 3 is provided with a pair of parallel screens 15 and 15' arranged in spaced relation thereon, which screens lie directly below the screens 12, and 12' in the trough 2. A similar pair of screens 16 and 16' are provided at approximately the center of the lower trough 3 beneath the screens 13 and 13'. A third pair of screens 17 and 17' are also arranged in the trough 3 beneath the screens 14—14' in the trough 2. The various pairs of screens 15—15', 16—16', and 17—17' correspond in their mesh to the overlying screens in the upper troughs 2.

A deflector chute 18 is arranged on the upper surface of the trough 3 to prevent an object dropping from the lowermost screen 12' of said upper trough onto the upper screen 15 of the lower trough. The chute 18 is directed downwardly to convey articles dropping through the screen 12' to a point directly adjacent the entrant end 19 of the screen 15. A similar chute 20 is disposed over the screen 16, and a chute 21 over the screen 17. The screens 15—15' and 16—16' and 17—17' have their contiguous ends separated as indicated at 22, to provide a substantial space therebetween, through which objects to be graded may pass when dropping from said screens into the collection bins therebeneath.

A collection bin 23 is provided beneath the screens 15—15'; a collection bin 24 beneath the screen 16—16'; and a collection bin 25 beneath the screens 17—17'. It will be noted that the forward wall of the middle bin 24 extends beneath the passage 22 between the screens 15 and 16 and that the forward wall of the bin 25 also extends beneath the passage between the screens 16 and 17. The bottom end of each of the bins is provided with a slide guide 26 therein to facilitate the discharge of products collected in said bins into boxes or conveyors disposed below said bins. In order to prevent objects being graded from moving down the chute 20 and into the bin 24, a barrier member 27 is arranged adjacent the entrant end of the screen 16, and a similar barrier member 28 is provided at the entrant end of the screen 17 to prevent graded objects from moving down the chute 21 and directly into the bin 25.

The cams 8 and 9 are so disposed that when rotated, the troughs 2 and 3 are caused to be simultaneously shaken in opposite directions. Objects to be graded, such as pre-cut string beans, and other elongated fruits and vegetables of selected length and size, are placed on the screen 12. Objects that are of the smallest length will pass through the screen 12 onto the screen 12', while larger pieces will advance progressively onto the screens 13 and 14. Objects that are of smaller length will pass through the screen 13 and drop down onto the screen 13'. Still larger pieces will pass through the screen 14 and drop down onto the screen 14'. Objects that cannot pass through any of the screens, will drop over the extreme end of the screen 14 into the collection chamber 29, from whence the same may be removed at the will of the operator. Objects that are collected upon the screen 12' and which are small enough in size, will pass down through said screen into the chute 18 and thence onto the entrant end of the screen 15. Objects that cannot pass through the screen 12' will advance onto the adjacent screen 13', and if small enough will pass through said screen down into the chute 20 and thence into the entrant end of the screen 16. Objects that cannot pass through the screen 13' will pass onto the screen 14', and if small enough will pass through said screen and drop down into the chute 21 and thence on to the entrant end of the screen 17. Objects that cannot pass through the screen 14' will drop down over the extreme outer end thereof, into the collection chamber 29. Graded objects that are collected on the screen 15, if small enough, will either pass through said screen and drop down onto the screen 15' or if said objects cannot pass through the screens 15—15', the same will be advanced over the ends thereof and will drop down through the passage 22 into the collection bin 24. Objects which succeed in passing through the screens 15—15' are collected in the bin 23. Objects which pass through the mesh of the screens 16—16' will drop into the collection bin 24 while larger objects which cannot pass through said screens will advance over the ends of said screens and drop down through the passage 22 into the collection bin 25. Objects which are deposited on the screen 17 and which succeed in passing therethrough, as well as the screen 17' therebeneath, will also be collected in the bin 25. Objects which cannot pass through either of the screens 17 and 17', will pass outwardly over the ends of said screens and drop into the collection chamber 29.

I have found that by grading pre-cut string beans with my grading apparatus, that it is possible to effect four distinct grades of the said pre-cut beans, the graded objects collected in the bin 23 being of the smallest size; those collected in the bins 24 and 25 being slightly larger; those collected in the bin 29 being the largest of all.

I have found that it is necessary in the grading of string beans to subject the same to continuous grading and regrading during one and the same operation, for otherwise it is not possible to segregate the grades with any degree of accuracy. I have also found that the smallest and largest grades of the beans approximate about ten percent each, while the remaining percentage is about equally divided between the two intermediate grades.

Having thus described this invention, what I claim and desire to secure by Letters Patent is:

1. A grading machine including a frame; pair of troughs oscillatably mounted on said frame in superposed relation; means to oscillate said troughs; a pair of superposed grading screens extended continuously throughout the length of said uppermost trough; a collection bin disposed at one end of said trough in communication with said screens; a pair of superposed grading screens arranged in said lowermost trough, said screens having transverse openings therein at spaced points throughout the length thereof; a plurality of collector bins beneath the grading screens in said lowermost trough, certain of said bins collecting the graded objects which pass through the screens directly thereabove, as well as the objects which fail to pass through the screens in advance of said bins.

2. A machine for grading irregular length objects comprising, an oscillatable trough; a double row of superposed grading screens in said trough, the screens in each row being continuous and progressively increased in mesh from the intake to the discharge end of said trough; an oscillatable trough beneath said first mentioned trough; a double row of superposed grading screens in said last mentioned trough, each of said screens on the same plane being separated and said screens being of progressively increased mesh from the intake to the discharge end of said trough; a bin at the discharge end of said screens to collect the objects which fail to pass through said screens; and separate bins beneath the respective screens of different mesh in said last mentioned trough to collect the objects which pass therethru and to collect the objects which fail to pass thru the screens in advance of said bins.

3. A machine for grading irregular length objects comprising, an oscillatable trough; a double row of superposed grading screens in said trough, the screens in each row being continuous and progressively increased in mesh from the intake to the discharge end of said trough; an oscillatable trough beneath said first mentioned trough; a double row of superposed grading screens in said last mentioned trough, each of said screens on the same plane being separated and said screens being of progressively increased mesh from the intake to the discharge end of said trough; a seperate chute beneath each of the respective screens of different mesh on said uppermost trough to direct the objects which pass through said screens to the intake end of the uppermost layer of screens on the lowermost trough; a bin at the discharge end of said screens to collect the objects which fail to pass thru said screens; and separate bins beneath the respective screens of different mesh in said last mentioned trough to collect the objects which pass therethru and to collect the objects which fail to pass thru the screens in advance of said bins.

4. A machine for grading irregular length objects comprising, a trough; a double row of superposed grading screens in said trough, the screens in each row being continuous and progressively increased in mesh from the intake to the discharge end of said trough; a trough beneath said first mentioned trough; a double row of superposed grading screens in said last mentioned trough, each of said screens on the same plane being separated and said screens being of progressively increased mesh from the intake to the discharge end of said trough; a bin at the discharge end of said screens to collect the objects which fail to pass thru said screens; separate bins beneath the respective screens of different mesh in said last mentioned trough to collect the objects which pass therethru and to collect the objects which fail to pass thru the screens in advance of said bins; a frame; pitmans on said frame on which said troughs are mounted; and means to reciprocate said troughs whereby the screen surfaces thereof will move in an orbitary path.

5. A machine for grading irregular length objects comprising, a trough; a double row of superposed grading screens in said trough, the screens in each row being continuous and progressively increased in mesh; a trough beneath said first mentioned trough; a double row of superposed grading screens in said last mentioned trough, each of said screens on the same plane being separated and said screens being of progressively increased mesh; a trough beneath said first mentioned trough; a double row of superposed grading screens in said last mentioned trough, each of said screens on the same plane being separated and said screens being of progressively increased mesh; separate bins beneath the respective screens of different mesh in said last mentioned trough to collect the objects which pass therethru and to collect the objects which fail to pass thru the screens in advance of said bins; a frame; pitmans on said frame on which said troughs are mounted; and means to reciprocate said troughs whereby the screen surfaces thereof will move in an orbitary path.

6. A machine for grading irregular length objects comprising, a trough; a double row of superposed grading screens in said trough, the screens in each row being continuous and progressively increased in mesh from the intake to the discharge end of said trough; a trough beneath said first mentioned trough; a double row of superposed grading screens in said last mentioned trough, each of said screens on the same plane being separated and said screens being of progressively increased mesh from the intake to the discharge end of said trough; a separate chute beneath each of the respective screens of different mesh on said uppermost trough to direct the objects which pass thru said screens to the intake end of the uppermost layer of screens on the lowermost trough; a bin at the discharge end of said screens to collect the objects which fail to pass thru said screens; separate bins beneath the respective screens of different mesh in said last mentioned trough to collect the objects which pass therethru and to collect the objects which fail to pass thru the screens in advance of said bins; a frame; pitmans on said frame on which said troughs are mounted; and means to reciprocate said troughs whereby the screen surfaces thereof will move in an orbitary path.

FORTUNATE E. GRECO.